M. CHAUMERET.
PARACHUTE FOR AEROSTATION AND AVIATION.
APPLICATION FILED APR. 10, 1912.
1,093,311.
Patented Apr. 14, 1914.
2 SHEETS—SHEET 1.
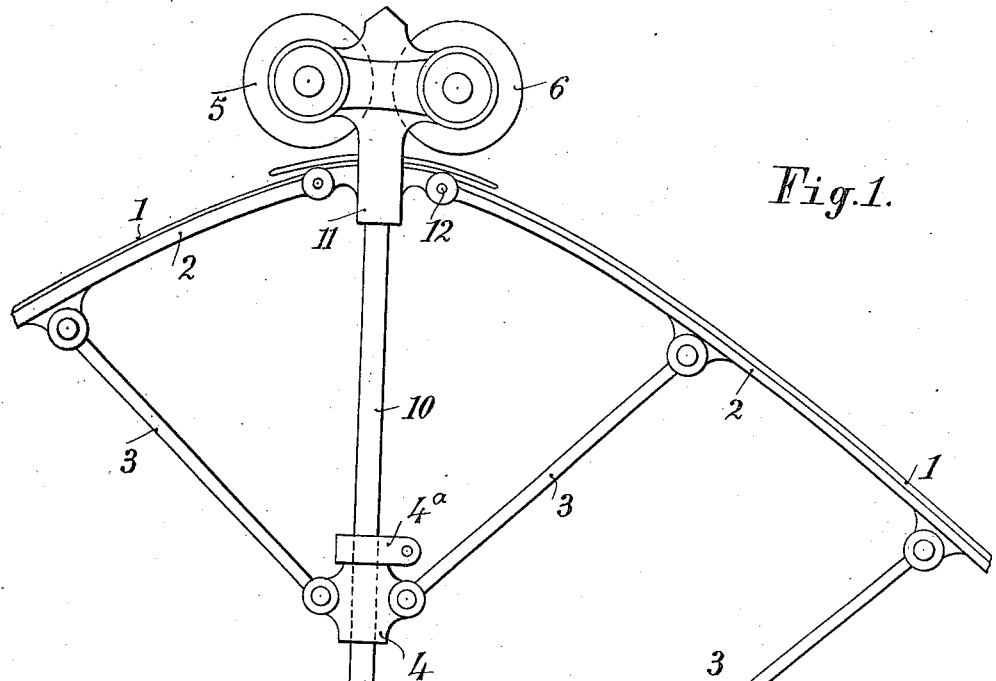
Fig. 1.
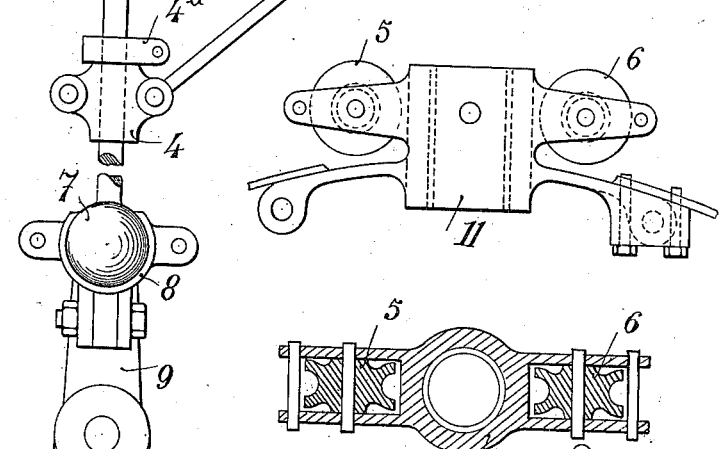
Fig. 5.
Fig. 6.

M. CHAUMERET.
PARACHUTE FOR AEROSTATION AND AVIATION.
APPLICATION FILED APR. 10, 1912.
1,093,311.
Patented Apr. 14, 1914.
2 SHEETS—SHEET 2.
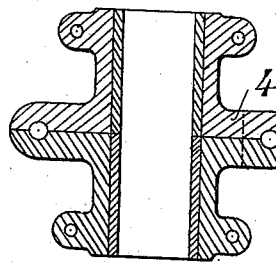
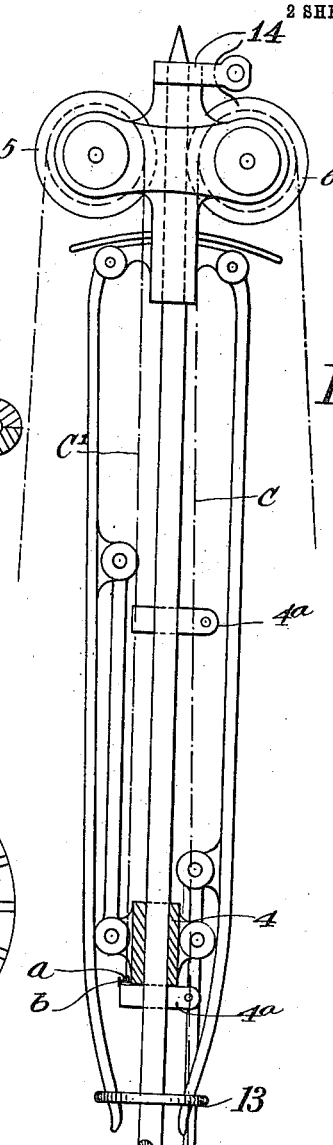
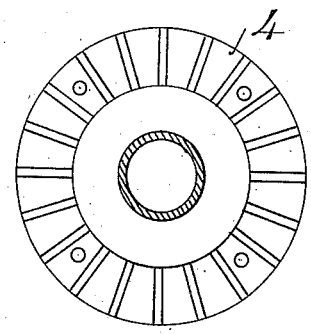
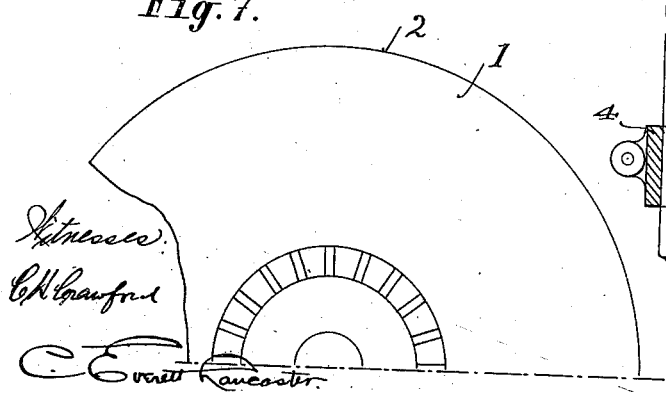

UNITED STATES PATENT OFFICE.

MARIUS CHAUMERET, OF PARIS, FRANCE.

PARACHUTE FOR AEROSTATION AND AVIATION.

1,093,311.  Specification of Letters Patent. Patented Apr. 14, 1914.

Application filed April 10, 1912. Serial No. 689,726.

*To all whom it may concern:*

Be it known that I, MARIUS CHAUMERET, a citizen of the Republic of France, residing at 15 Rue Civiale, Paris, in the Republic of France, have invented a certain new and useful Improved Parachute for Aerostation and Aviation, of which the following is a specification.

This invention has reference to a parachute to be used by aeronauts and aviators in descending for avoiding any fatal or even dangerous fall of the aeronauts or aviators.

I shall now describe my invention with reference to the accompanying drawing showing one form of construction of the apparatus, in which:—

Figure 1 is an elevation of the parachute expanded. Fig. 2 shows the parachute folded. Fig. 3 is a detail view, showing the sliding sleeve in cross section. Fig. 4 is a top plan view thereof. Fig. 5 is a detail view of the wheels guiding the manipulating cords and their supports, and Fig. 6 is a horizontal section therethrough. Fig. 7 shows diagrammatically a portion of the expanded parachute.

Referring to the drawing, 1 is the covering material stretched over flexible wooden ribs or whale-bones 2, which are pivotally connected to steel rods 3 fastened at their lower ends to sleeves 4 sliding on the central pole 10. The upward movement of the sleeves 4 along the pole 10 is limited by stops $4^a$. The pole 10 ends in a ball 7 arranged in a hollow socket 8 so as to form a ball joint. At its upper end the pole 10 is provided with a support 11 having side projections or lugs 12 for pivotally receiving the upper ends of the ribs 2. This support also carries the spindles of the grooved wheels 5 and 6 over which the manipulating cords are passed.

This parachute with its very simple mechanical movement has the advantage of being perfectly rigid and the cover very tightly stretched by the flexible wooden rib, which can be replaced by steel or whale-bone preferably the latter. These flexible ribs 2 are for their part tightly stretched by the round steel rods 3 pivotally fastened to the sleeves sliding on the pole 10 and serving to stretch and expand the parachute and hold it rigid.

The parachute is closed (Fig. 2) and placed horizontally parallel to the longitudinal axis of the tail of the aeroplane, and upon the same. It does not interfere with any movement of the aviator or of the aeroplane. When the device is closed, the operator pulls on the cord $C'$, fastened to the upper sleeve 4 in order to effect an engagement between the small arm of the lever $a$ and the sleeve 4, with the hook —$b$— on the lower stationary ring $4^a$ whereafter a rubber ring or the like 13 is slid over the ends of the ribs for holding them together.

In order to open the parachute it is only necessary to pull cord $C'$ in order to effect the disengagement of the small arm of the lever $a$ and the ring 4 which is in engagement with a hook $b$ of the lower stationary ring $4^a$. Hereafter, also the rubber ring 13 is disengaged and the parachute will open automatically if the whalebone ribs are working properly, under the expanding action of said whale-bones which heretofore has been held under tension, and assisted by the influence of the air or wind collecting under the partly opened parachute and exerting a pressure upon the underside of its roof. If however the whale-bones should fail to act properly, a pull exerted on cord C secured to the lower ring 4 will be sufficient to assure an immediate opening of the parachute. It is to be understood, that the ends of the cords C and $C'$ passing over the pulleys 5 and 6 are always within convenient reach of the aviator, so that at the least danger the aviator pulls the cord which is within his reach, disengaging thereby the small arm of the lever $a$ and the ring 4 and at the same time pulls back the rubber ring.

This parachute can be fastened to the aeroplane as has been described above, the fastening forming a hood in which is passed the support 9 through which passes a shaft forming hinge and thus permits the straightening up of the parachute. The use of the ball joint is of inestimable value for the satisfactory working of the apparatus and permits an undulating movement. The yoke 14 above the wheel 6 (Fig. 2) is detachably held by a spring clip to the tail end of an aerial craft.

This parachute can also be fastened to a seat of the arm-chair type situated between the longitudinal parallel side rods or prolongations of the framework forming the tail of the aeroplane. This seat may be made to accommodate one or more persons and is fastened by a device which can be released simultaneously with the opening of the parachute which latter being attached to one wall of the seat will support the seat and prevent it falling, whereas the aeroplane will fall down by itself together with its engine, its petrol and all its accessories thereby considerably decreasing the work required of the parachute. It is evident that the aviator or aviators should be fastened to the seat.

What I claim as my invention and desire to secure by Letters Patent of the United States is:—

1. A parachute of the character described for an aerial craft comprising in combination, a central pole, two superposed sleeves sliding along said pole, stops for limiting the upward movement of said sleeves, two sets of steel rods pivotally secured with their lower ends to their respective sleeves, a supporting bracket upon the upper end of said pole, ribs carrying the material forming the roof of the parachute, adapted to be expanded by said rods and pivotally secured with their inner ends to said bracket, pulleys upon said bracket at opposite sides thereof, cords passing over said pulleys in opposite directions, one of said cords being secured with one of its ends to a ring of the upper movable sleeve engaging a hook of the lower stop and having its other end at the disposal of the aviator, the engagement between the upper sliding sleeve and the lower stop being for the purpose of allowing an automatic expansion of the parachute on release, and the other of said cords being secured with one of its ends to the lower of said movable sleeves, and having its other end at the disposal of the aviator for starting the automatic opening of the parachute by its expanding ribs, an elastic ring for securing the lower ends of said ribs while the parachute is folded, and means for detachably securing the parachute in its closed position to the tail-end of an aerial craft, substantially as described.

2. A parachute of the character described for an aerial craft detachably secured to said craft, and comprising in combination, a central pole supporting superposed sliding sleeves and upper and lower stops for limiting their upward movement, a bracket upon the upper end of said pole, ribs for carrying the material forming the roof of the parachute pivotally secured with their inner ends to said bracket, two sets of steel rods pivotally connected to said sliding sleeves and to said ribs, means for securing the parachute in its folded position, and means for mechanically releasing said securing means for positively expanding the parachute, a pair of pulleys upon said bracket at opposite sides thereof, over which cords are guided in opposite directions, a hook upon the lower stationary stop adapted to be engaged by a ring of the upper of the sliding sleeves to which one end of one of said cords is secured for disengaging said ring from said hook, upon a pull exerted upon the free end of said cord, a ring upon the lower of said sliding sleeves to which one end of the other cord is fastened for moving said sliding sleeve upward upon a pull exerted upon the free end of said cord for positively opening the parachute under the expansion of said ribs, substantially as described.

In testimony whereof I have signed this specification in the presence of two subscribing witnesses.

MARIUS CHAUMERET.

Witnesses:
   VICTOR PRÉVOST,
   H. C. COXE.

Copies of this patent may be obtained for five cents each, by addressing the "Commissioner of Patents, Washington, D. C."